United States Patent
Dalzell et al.

(10) Patent No.: US 9,135,473 B2
(45) Date of Patent: Sep. 15, 2015

(54) METHOD AND APPARATUS FOR ERASURE OF DATA FROM A DATA STORAGE DEVICE LOCATED ON A VEHICLE

(75) Inventors: William J. Dalzell, Parrish, FL (US); Scott G. Fleischman, Palmetto, FL (US); James L. Tucker, Clearwater, FL (US)

(73) Assignee: Honeywell International Inc., Morristown, NJ (US)

( * ) Notice: Subject to any disclaimer, the term of this patent is extended or adjusted under 35 U.S.C. 154(b) by 1782 days.

(21) Appl. No.: 11/835,490

(22) Filed: Aug. 8, 2007

(65) Prior Publication Data

US 2011/0004938 A1    Jan. 6, 2011

(51) Int. Cl.
    *G06F 21/78*      (2013.01)
    *F42D 3/00*      (2006.01)
    *G06F 21/62*      (2013.01)

(52) U.S. Cl.
    CPC    *G06F 21/78* (2013.01); *F42D 3/00* (2013.01); *G06F 21/62* (2013.01); *G06F 2221/2113* (2013.01); *G06F 2221/2143* (2013.01)

(58) Field of Classification Search
    CPC ................................................ G06F 21/78
    USPC ............................................................. 726/34
    See application file for complete search history.

(56) References Cited

U.S. PATENT DOCUMENTS

| | | | |
|---|---|---|---|
| 5,111,402 A | | 5/1992 | Brooks |
| 5,736,777 A | * | 4/1998 | Shield et al. ............... 257/529 |
| 5,889,866 A | * | 3/1999 | Cyras et al. ............... 713/192 |
| 6,278,913 B1 | | 8/2001 | Jiang |
| 6,346,892 B1 | | 2/2002 | DeMers |
| 6,731,447 B2 | | 5/2004 | Bunker |
| 6,928,551 B1 | | 8/2005 | Lee |
| 7,003,621 B2 | | 2/2006 | Koren |
| 7,127,334 B2 | | 10/2006 | Frink |
| 2003/0126215 A1 | * | 7/2003 | Udell et al. ............... 709/206 |
| 2008/0212266 A1 | * | 9/2008 | White ......................... 361/679 |

\* cited by examiner

*Primary Examiner* — Jacob Lipman
(74) *Attorney, Agent, or Firm* — Shumaker & Sieffert, P.A.

(57) ABSTRACT

A method and system for destroying information stored on a data storage device located onboard a vehicle in order to prevent unfriendly forces from obtaining the information is described. The method and system are initiated when the operator of the vehicle activates a triggering mechanism. The information may be destroyed by physically damaging the data storage device on which the information is stored or by releasing a software virus into the device on which the sensitive information is stored. A software virus may also be transmitted to a computer of an unfriendly force attempting to access the sensitive information.

19 Claims, 8 Drawing Sheets

METHOD AND APPARATUS FOR ERASURE OF DATA FROM A DATA STORAGE DEVICE LOCATED ON A VEHICLE

FIELD

The present invention relates generally to methods of erasing proprietary or sensitive information in the event of an emergency, and, more particularly, to the erasure of proprietary and sensitive information in the event of a high probability of abandonment or capture of a vehicle.

BACKGROUND

Vehicles, such as planes, trucks, cars, tanks and boats, may be equipped with a data storage device. Often this data storage device may contain sensitive information that the operator of the vehicle or the owner of the information may wish to prevent from being disseminated. Examples of such information are proprietary algorithms, communication keys, surveillance data, mission data, or any other type of data that is considered to be sensitive or proprietary information.

When the operator of a vehicle that has sensitive information stored onboard is required to abandon the vehicle, the sensitive information stored on that vehicle is in danger of being retrieved by an unfriendly party. This is undesirable as the unfriendly party may obtain the information, such as methods of communication and encryption, surveillance data, and operational data. Such information may allow the unfriendly parties to predict future actions of the operator of the vehicle or the entity that controls the vehicle.

In military operations, the risk of unfriendly parties obtaining or attempting to obtain sensitive information in the event that the operator of the vehicle must abandon that vehicle is very high.

Similarly, in corporate operations, companies may send exploring teams to search for mineral or energy resources. These companies are often strongly competitive and much of their business is derived from protecting proprietary information. Exploratory operations, therefore, are also interested in preventing competitors from obtaining access to proprietary information located onboard field vehicles.

Therefore, there is a need for an improved system and method of protecting sensitive information from retrieval by unfriendly parties.

SUMMARY

The present invention relates to a method for destroying sensitive information stored onboard a vehicle. The method is initiated when the operator of the vehicle activates a triggering mechanism. Many types of vehicles are charged with assignments for which there is a possibility that the operator may have to abandon the vehicle, or for which there is a possibility that the vehicle may be captured by unfriendly forces. In such a situation, it is desirable that the operator of the vehicle be able to initiate the destruction of sensitive information in order to protect it from being made available to others.

In the event that an operator of a vehicle believes that there is a strong likelihood that the vehicle will be captured or that he will have to abandon the vehicle, he may activate a data destruction sequence by activating a triggering mechanism. This triggering mechanism may be a stand-alone hard-wired trigger. Alternatively, it may be connected in sequence with another device indicating that the operator intends to abandon the vehicle, for example, an ejector seat trigger of an aircraft.

When the operator activates the triggering mechanism, a sequence is initiated to destroy sensitive information. The information may be destroyed by physically damaging the data storage device on which the information is stored, or by releasing a software virus onto the data storage device on which the sensitive information is stored.

In another embodiment, the information may be divided into two categories: sensitive information to be destroyed when the operator abandons the vehicle, and confidential information to be destroyed upon an attempt by an unfriendly party to access the information. In this scenario, both categories of information may be destroyed upon the occurrence of the corresponding event either by physical destruction of the data storage device or through the release of a software virus.

The information may be designated to be destroyed either before the vehicle is deployed or during the vehicle's deployment. The information may be any type of information, including proprietary software, surveillance data, mission data, communication codes, and so on. The vehicle may be any type of land, air, or water vehicle.

The information may be destroyed by an explosive device, exposure to chemicals, mechanical damage that destroys the hardware storage device, magnetic erasure, or by releasing a software virus into the device on which the sensitive information is stored. A software virus may also be transmitted to a computer of an unfriendly force attempting to access the sensitive information.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
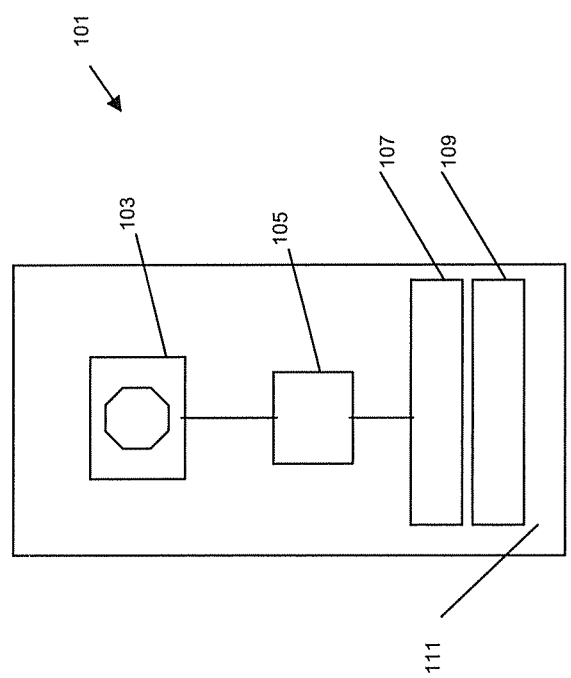
FIG. 1 is a block diagram of a system for destroying information stored on a storage device, according to an example.

Within the embodiments described below, a method is provided for destroying information stored on a computer located onboard a vehicle. The information may be destroyed in response to the operator of the vehicle activating a triggering mechanism or in response to an attempt by unfriendly forces to access the data.

Many types of vehicles are charged with assignments for which there is a possibility that the operator may have to abandon the vehicle or that the vehicle may be captured by unfriendly forces. In such a situation, it is desirable that the operator of the vehicle be able to initiate the destruction of sensitive information in order to protect it from being made available to others.

For instance, military vehicles often have sensitive information stored onboard the vehicle relating to mission data, methods of communication, encryption codes, and surveillance data, among other things. This information may be important for the operator of the vehicle to have in order to complete the assignment, and it is desirable for the operator to have access to any information that may help him to complete his assignment. However, it is also important that this information not fall into the hands of unfriendly forces. Such information could provide unfriendly forces with the ability to decode encrypted messages, access communications channels, and to obtain information about military surveillance operations, potential targets, and locations of military entities, among other things.

Therefore, it is desirable to protect this sensitive information from possible retrieval by unfriendly forces. Also, it is desirable to allow the operator of the vehicle to determine when the "point of no return" has occurred, i.e., the point at which he must abandon the vehicle or face capture. In such a situation, the operator of the vehicle may be in the best position to determine when such information should be destroyed.

Also, as the operator may need the sensitive information in order to complete the assignment or to safely return from the assignment, it is advantageous that the operator be able to decide when to trigger the destruction of the sensitive information. Because the operator will want to keep the information as long as possible to increase the probability of completing the assignment and of returning from the assignment safely, he will attempt to keep the information intact as long as possible. However, when it becomes apparent that he will have to abandon the vehicle or that the vehicle is likely to fall under the control of unfriendly forces, the operator may activate the destruction sequence.

One alternative is triggering the destruction sequence via a transmission from a supervisor or another person based on information obtained from surveillance and communications with the operator. However, the supervisor may have an inferior set of information and, therefore, the likelihood is high that the supervisor may be inclined to destroy the information to protect it from capture before the "point of last return," potentially endangering the operator of the vehicle unnecessarily.

Another situation in which it may be advantageous for the operator of a vehicle to be able to initiate the destruction of sensitive information is corporate exploration and scientific investigation, for example, to obtain information about and monitor the research, discovery, and extraction of natural resources. The vehicles used for these assignments may also have sensitive information onboard, and in the event that the operator of the vehicle must abandon the vehicle, the sensitive information should be destroyed in order to protect it from being acquired by competitors. Often the information obtained or used on these assignments may be very valuable and may give a competitive advantage in the marketplace over competitors. Therefore, it is desirable to protect such sensitive information from being transmitted to competitors, as described below.

FIG. 1 shows a block diagram of a system 101 for destroying information stored on a data storage device. The vehicle 111 has a triggering mechanism 103, an initiation device 105, a destruct device 107, and a data storage device 109. The vehicle 111 may be any type of vehicle, such as an airplane, a car, a truck, a tank, or a boat.

The triggering mechanism 103 may be a hard-wired device such as a button, a switch, a lever, or any device operable to trigger an event. The triggering mechanism 103 should be readily accessible by the operator of the vehicle 111 so that he may quickly initiate a data destruct sequence in case of emergency. For example, the triggering mechanism 103 may be a lever or switch located on the vehicle control panel.

The data storage device 109 may be a hard drive, a thumb drive, a disk, a memory storage device, such as ROM, RAM, EEPROM, flash memory and so on, or any other type of data storage device known in the art. The data stored on the data storage device 109 may include proprietary algorithms, communication keys, surveillance data, mission data, or any other type of proprietary or non-proprietary data.

The destruct device 107 may be any device that is capable of destroying the data stored on the data storage device 109. The destruct device 107 is preferably located on the vehicle 111 in a proximity to the data storage device 109 such that the destruct device 107 may destroy the data on the data storage device 109. Data may be stored on the data storage device 109. For example, the destruct device 107 may he located adjacent to the data storage device 109 or be included as part of or within the data storage device 109. Alternatively, the destruct device 107 may be at a distance away from the data storage device 109, but still close enough to destroy the data.

In one example, the destruct device 107 may be any type of chemical explosive, which, upon detonation, destroys the data storage device 109. The destruct device 107 may also be a type of chemical that destroys the data on the data storage device 107 when the data storage device 109 is exposed to the chemical.

Alternatively, the destruct device 107 may be a device that destroys the data storage device 109 by imparting physical damage to the data storage device 109 via impact. Such a device may be a mechanical apparatus having, for example, spikes or hammers that impact the data storage device 109. In this example, the destruct device 107 destroys the data storage device 109 by piercing or crushing the data storage device 109.

The destruct device 107 may also be a magnet that erases magnetic data stored on the data storage device 109 when the magnet is passed over the data storage device 109. After the destruct device 107 is activated, the data stored on the data storage device 107 may be rendered irretrievable. Other types of devices capable of destroying the data on the data storage device 109 may also be used.

The initiation device 105 may be any type of device that recognizes that the triggering mechanism 103 has been activated and, in response to that activation, activate the destruct device 107 to destroy the data storage device 107. Alternatively, the triggering mechanism 103 may also be capable of directly activating the destruct device 107.

For example, if the destruct device 107 is a chemical explosive, the initiation device 105 may be any type of firing circuit capable of receiving a signal from the triggering mechanism 103 and igniting the explosives of the destruct device 107. One example of such an initiation device is the self-destruct firing circuit described in U.S. Pat. No. 6,865,989.

As another example, if the destruct device 107 is a chemical, the initiation device 105 may mechanically affect the release of the chemical of the destruct device 107 into the data storage device 109. One example of such an initiation device 105 would be a relay that, upon recognizing that the triggering mechanism 103 has been activated, pierces a seal or springs open a cover of a receptacle of the destruct device 107.

As another example, if the destruct device 107 is one that causes physical damage to the data storage device 109 via impact, the initiation device 105 may be a relay that closes a switch that activates the mechanical movement of the destruct device 107.

Still further, if the destruct device 107 is a magnet, the initiation device 105 may be a relay that closes a switch that activates the movement of the magnet.

Many other embodiments of an initiation device 105 as described are known and may be used to activate the destruct device 107.

The triggering mechanism 103 is coupled to the initiation device 105. When the operator activates the triggering mechanism 103, the initiation device 105 receives the signal from the triggering mechanism 103 that the trigger has been activated and activates the destruct device 107. The destruct device 107 then renders the information stored on the data storage device 109 irretrievable.

Figure 2:
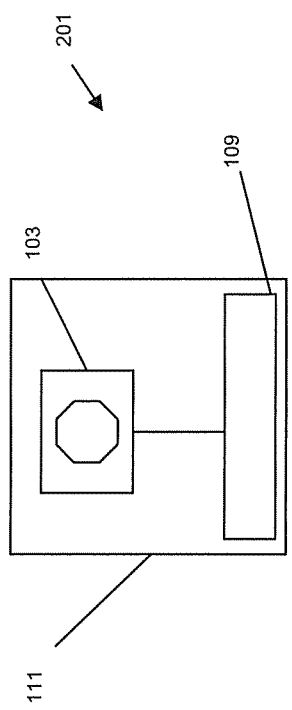
FIG. 2 is a block diagram of a system for destroying information stored on a storage device, according to an example.

FIG. 2 shows a block diagram of a system 201 for destroying information stored on a data storage device 109. The vehicle 111 has a triggering mechanism 103 and a data storage device 109, as described with respect to FIG. 1. When the operator activates the triggering mechanism 103, a software virus is released into the data storage device 109. After the virus is released into the data storage device 109, the information stored on the data storage device 109 may be irretrievable. Many variations of software viruses are known and are continually being developed. Any virus now known or developed in the future may be used to destroy the data on the data storage device 109.

Figure 3:
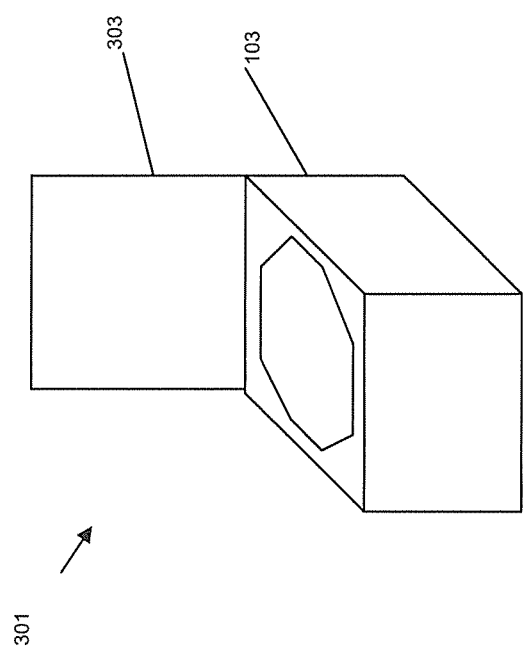
FIG. 3 shows a triggering mechanism with an anti-tamper shield, according to an example.

FIG. 3 shows the triggering mechanism 103, as discussed with respect to FIG. 1, and an anti-tamper shield 303. The anti-tamper shield 303 may be any material, such as plastic, that fits over the triggering mechanism 103. The anti-tamper shield 303 prevents inadvertent activation of the triggering mechanism 103 by requiring the operator to remove the anti-tamper shield 303 before the triggering mechanism 103 may be activated.

Depending on the type of triggering mechanism 103, e.g., a button, a switch, or a lever, the anti-tamper shield 303 may be a different shape. For instance, if the triggering mechanism 103 is a button or a switch, the anti-tamper shield 303 may be a plastic cover that fits over the button or switch. The operator may then lift the anti-tamper shield 303 in order to be able to activate the triggering mechanism 103. Alternatively, if the triggering mechanism 103 is a lever, the anti-tamper shield 303 may be a catch that that fits over a portion of the lever. The operator may then disengage the catch in order to activate the triggering mechanism 103.

Figure 4:
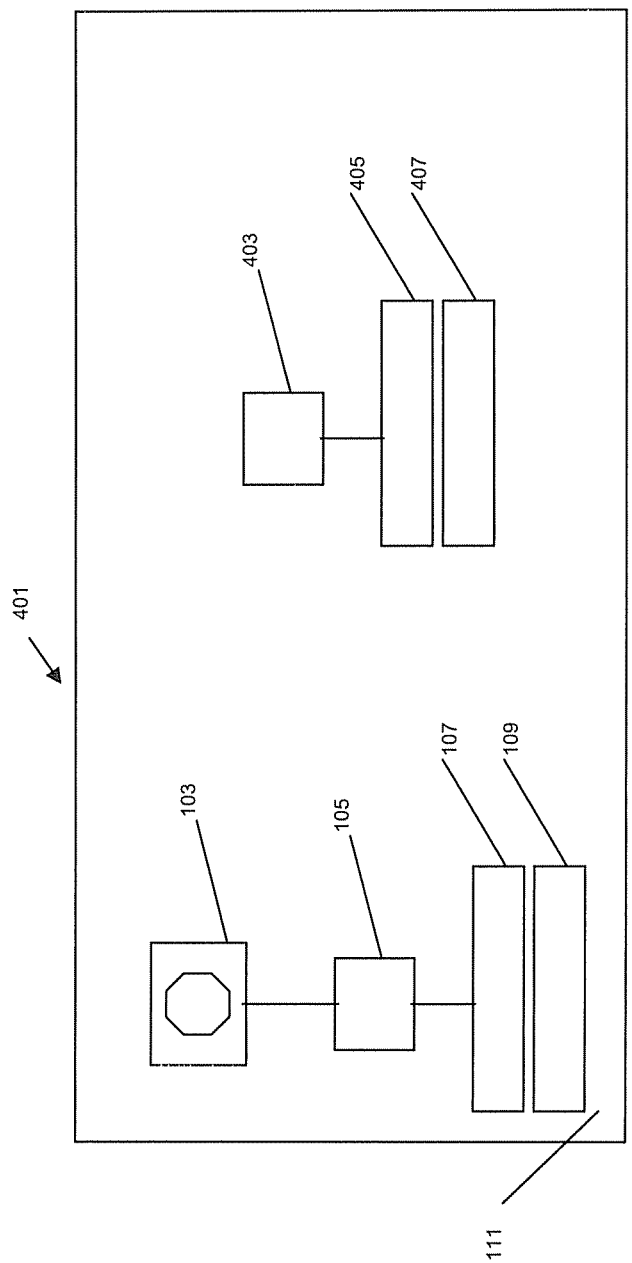
FIG. 4 is a block diagram of a system for destroying information stored on a storage device, and for destroying confidential information stored on a second storage device, according to an example.

FIG. 4 shows a block diagram of a system 401 for destroying sensitive information stored on a data storage device and for destroying confidential information stored on a second data storage device. FIG. 4 depicts the vehicle 111, the triggering mechanism 103, the initiation device 105, the destruct device 107, and the first data storage device 109, which are described with respect to FIG. 1. FIG. 4 also depicts the vehicle 111 having a detection device 403, a virus transmitting device 405, and a second storage device 407.

Figure 7:
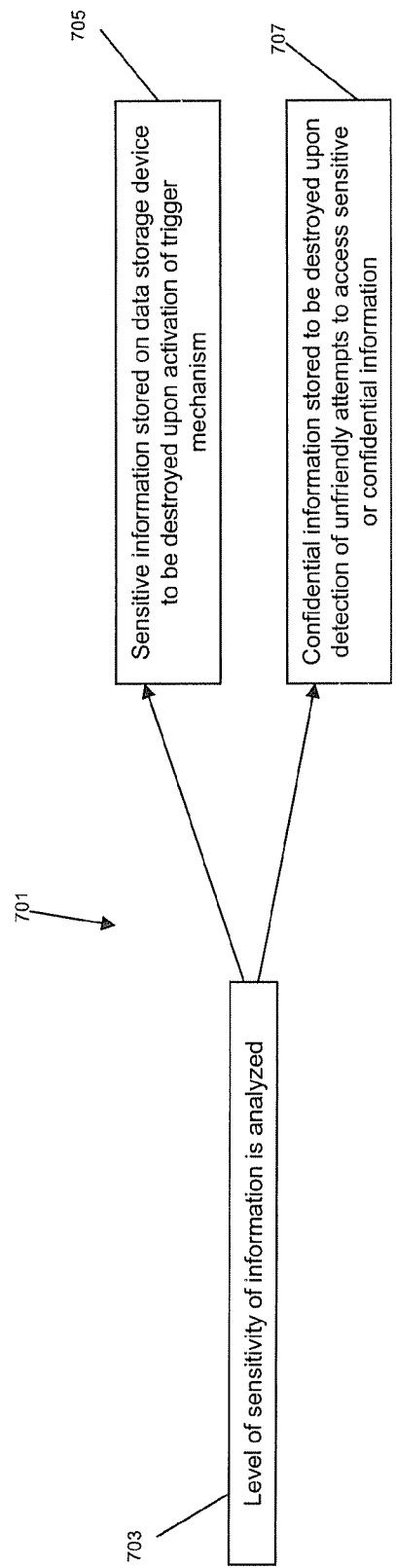
FIG. 7 is a flowchart of a method for segregating sensitive and confidential information, according to an example.

In this example, information is categorized into the categories of sensitive information and confidential information, described further with respect to FIG. 7. The sensitive information is stored on the first data storage device 109. The confidential information is stored on the second data storage device 407. The initiation device 105 may be any of the examples described with respect to FIG. 1, and the destruct device 107 may be any of the destruct devices described with respect to FIG. 1. When the operator activates the triggering mechanism 103, the sensitive data is destroyed by the destruct device 109.

The detect device 403 may be any device that is capable of detecting unfriendly attempts to access the second data storage device 407. Attempts to access data may be classified as friendly by requiring a password to access the data, the use of a hardware against software piracy key (HASP), recognizing a Media Access Control (MAC) address, a specific IP address, designating accepted domain names, designating trusted pairings for Bluetooth and wireless access, and other methods known in the art.

The virus transmitting device 405 may be part of the detect device 403, part of the second data storage device 407, or a stand-alone unit. The vehicle 111 may be any type of vehicle, such as an airplane, a car, a truck, a tank, or a boat.

The virus transmitting device 405 receives the signal from the detect device 403 that an unfriendly party is attempting to access the data on the second data storage device 407. The virus transmitting device 405 then transmits a software virus into the second data storage device 407 and thereby destroys the confidential information stored on the second data storage device 407.

Further, the virus transmitting device may, upon receiving the signal from the detect device 403 that an unfriendly party is attempting to access the information stored on the second data storage device 407, transmit a software virus to the computer or device of the unfriendly party attempting to access the data stored on the second data storage device 407.

Figure 5:
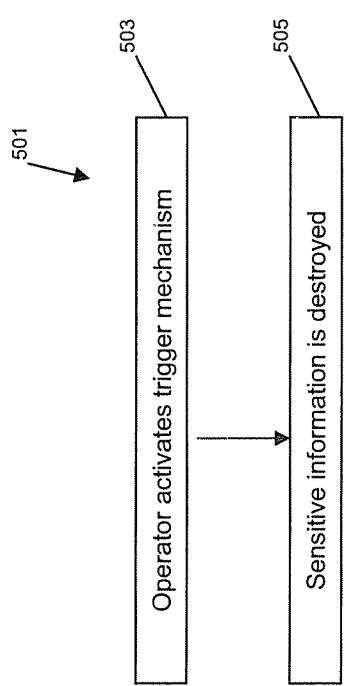
FIG. 5 is a flowchart of a method for destroying sensitive information, according to an example.

FIG. 5 shows a flowchart of a method 501 for initiating a data destruction sequence when an operator activates a triggering mechanism 103. At block 503 of the method 501, an operator activates the triggering mechanism 103. At block 505, sensitive information is destroyed by one of the methods described with respect to FIGS. 1 and 2. The operator may then abandon the vehicle knowing that an unfriendly party will not be able to access the data.

Figure 6:
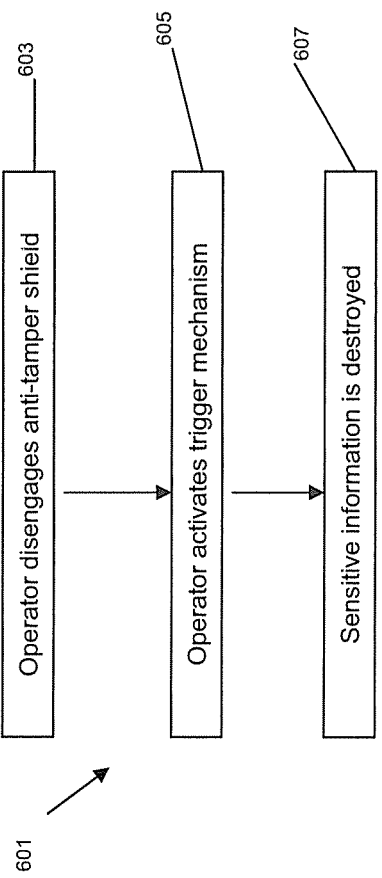
FIG. 6 is a flowchart of a method for destroying sensitive information, according to an example.

FIG. 6 shows a flowchart of a method 601 for initiating a data destruction sequence when there is an anti-tamper shield 303 that protects the triggering mechanism 103. At block 603, the operator disengages or removes the anti-tamper shield 303. At block 605, the operator activates the triggering mechanism 103. In this example, the triggering mechanism 103 may be a trigger activated by a pilot to initiate an ejector seat system on the aircraft. The pilot, by depressing one trigger, both ejects from the aircraft and initiates a data destruct sequence, as described with respect to FIGS. 1 and 2. At block 607, the sensitive information is destroyed in response to the activation of the triggering mechanism 103.

FIG. 7 shows a flowchart of a method 701 for designating information into categories according to the circumstances in which it is desired that the information be destroyed. At block 703 of method 701, the level of confidentiality of the information stored onboard the vehicle is determined. The level of confidentiality of the information may be determined by a field supervisor, the person responsible for loading the data onto the data storage device 109, by the operator, or by any other person responsible for either the equipment or the data.

At block 705, sensitive information is designated to be destroyed upon the activation of the triggering mechanism 103. Sensitive information may be information that is so critically important to keep secret that it should be destroyed upon abandonment of the vehicle 111 by the operator.

At block 707, confidential information is designated to be destroyed upon detection of attempts to retrieve information by unfriendly forces 103. Confidential information may be information that is less critically secret than sensitive information. Confidential information may be proprietary information and may be helpful to the operator of the vehicle. Therefore, confidential information may be kept intact until there is an attempt to retrieve the confidential information by an unfriendly party.

Figure 8:
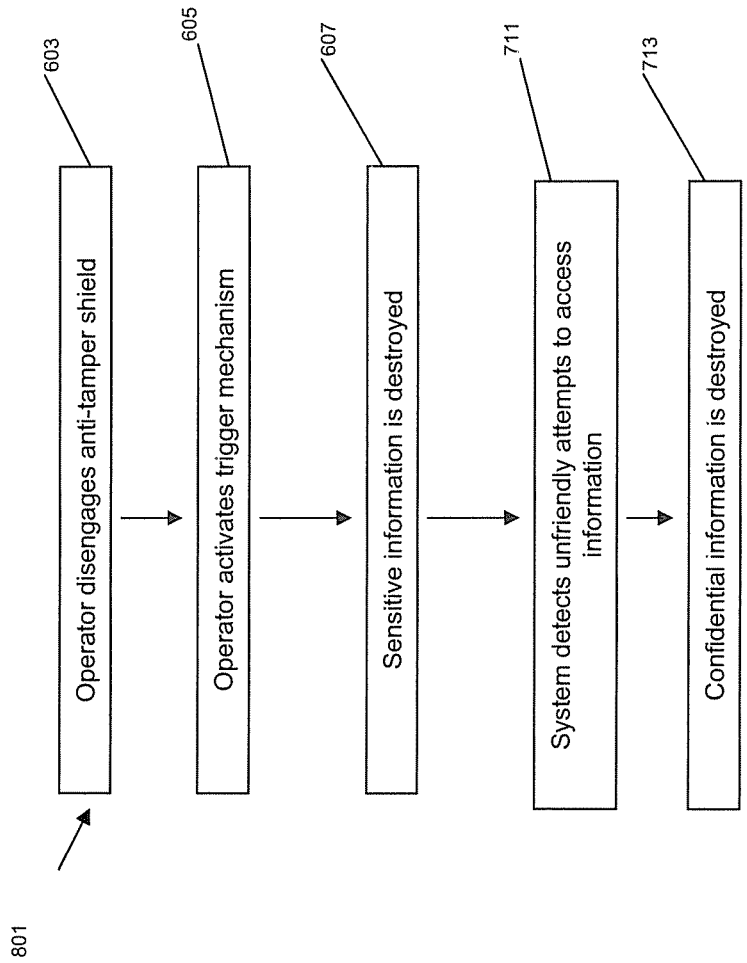
FIG. 8 is a flowchart of a method for destroying sensitive and confidential information, according to an example.

FIG. 8 shows a flowchart of a method 701 for destroying sensitive information and confidential information in two steps. Steps 603, 605, and 607 have been described with respect to FIG. 6. At block 811, the computer onboard the vehicle 111 detects unfriendly attempts to access information as described with respect to FIG. 4. At block 813, the confidential information is destroyed by one of the methods described with respect to FIGS. 1 and 2.

The methods 701 and 801 provide added reliability to the data destruction sequence. Because information may be designated as either confidential or sensitive, the data may be destroyed at different times. Therefore, the operator of the vehicle 111 may initiate the triggering mechanism 103 and destroy the confidential information in order to prevent it from being retrieved by unfriendly forces. However, the operator may wish to keep intact certain confidential information, such as terrain maps, communication keys, and other types of confidential information, as this information may aid the operator in returning to safety or in completing the assignment.

The method 701 provides the highest security for sensitive information by destroying the sensitive information upon activation of the triggering mechanism 103. The confidential information is destroyed when an attempt to access the information by an unfriendly force is detected. However, the process of detecting whether the entity attempting to access the information is friend or foe may be less reliable than the hard-wired triggering mechanism 103. Therefore, data that is less critically sensitive may be protected as described with respect to steps 811, 813.

It should be understood that the illustrated embodiments are examples only and should not be taken as limiting the scope of the present invention. The claims should not he read as limited to the described order or elements unless stated to that effect. Therefore, all embodiments that come within the scope and spirit of the following claims and equivalents thereto are claimed as the invention.

We claim:

1. A method comprising:
   receiving, by an initiation device, a signal created by a triggering mechanism upon activation of the triggering mechanism by an operator of a vehicle, wherein the vehicle comprises the initiation device, the triggering mechanism, a first data storage device storing sensitive information, and a second data storage device storing confidential information, and wherein the sensitive information and the confidential information were designated prior to deploying the vehicle; and
   in response to receiving, by the initiation device, the signal created by the triggering mechanism, controlling a destruct device to destroy, using at least one of physical impact by a mechanical device, a software virus, a chemical, a chemical explosive, or a magnet, the sensitive information while leaving the second data storage device storing the confidential information intact.

2. The method of claim 1, wherein the vehicle is a plane, wherein the operator is a pilot, and wherein the triggering mechanism is activated by activating an ejector seat on the plane.

3. The method of claim 1, wherein destroying the sensitive information includes releasing a software virus into the first data storage device.

4. The method of claim 1, wherein destroying the sensitive information includes using chemical explosives.

5. The method of claim 1, wherein destroying the sensitive information includes imparting physical damage to the data storage device via impact.

6. The method of claim 1, wherein destroying the sensitive information includes passing a magnet over the data storage device.

7. The method of claim 1, further comprising:
   detecting, by a computer onboard the vehicle, unfriendly attempts to access the confidential information stored on the second data storage device; and
   destroying, by the computer, the confidential information in response to detecting unfriendly attempts to access the confidential information.

8. The method of claim 7, wherein destroying the confidential information includes transmitting, by the computer onboard the vehicle, a software virus to a computer attempting to access the confidential information.

9. The method of claim 1, wherein the sensitive information comprises information that is more sensitive than the confidential information.

10. A method comprising:
    prior to deploying a vehicle, designating sensitive information to be destroyed upon activation of a triggering mechanism;
    prior to deploying the vehicle, designating confidential information to be destroyed upon detection of unfriendly attempts to access the confidential information;
    storing the sensitive information on a first data storage device located onboard the vehicle;
    storing the confidential information on a second storage device located onboard the vehicle;
    receiving, by an initiation device, a signal from the triggering mechanism upon activation of the triggering mechanism by the operator;
    controlling, by the initiation device, in response to the signal from the triggering mechanism, a destruct device to destroy the sensitive information using a destruct device located near the first data storage device while leaving the confidential information intact;
    detecting, by a computing device, unfriendly attempts to access the confidential information stored on the second data storage device; and
    destroying, by the computing device, the confidential information in response to detecting unfriendly attempts to access the confidential information.

11. The method of claim 10, further comprising removing an anti-tamper shield adjacent to the triggering mechanism before activating the triggering mechanism.

12. The method of claim 10, wherein destroying the sensitive information includes destroying the sensitive information using at least one of releasing a software virus into the first data storage device, using chemical explosives, using chemicals, using a magnet, or imparting physical damage to the first data storage device.

13. The method of claim 10, wherein destroying the confidential information includes releasing a software virus into the second data storage device, wherein the software virus destroys the confidential information.

14. The method of claim 10, further comprising transmitting a software virus to a computer attempting to access the second data storage device.

15. The method of claim 10, wherein the sensitive information comprises information that is more sensitive than the confidential information.

16. A system
   a first data storage device storing sensitive information, wherein the first data storage device is located in a vehicle;
   a second data storage device located in the vehicle, wherein the second data storage device stores confidential information;
   a triggering mechanism located on the vehicle;
   an initiation device coupled to the triggering mechanism; and
   a destruct device located in the vehicle, wherein the destruct device is selected from the group consisting of a chemical explosive, a chemical, a magnet, a computer virus, and a mechanical device that physically damages the first data storage device, wherein the initiation device activates the destruct device when the triggering mechanism is activated, and wherein the destruct device, when activated, is configured to destroy information stored on the first data storage device while leaving intact the second data storage device.

17. The system of claim 16, wherein the triggering mechanism comprises a trigger that initiates an ejector seat system on an aircraft.

18. The system of claim 16, further comprising an anti-tamper shield that fits over the triggering mechanism.

19. The system of claim 16, wherein the sensitive information comprises information that is more sensitive than the confidential information.

\* \* \* \* \*